US012587295B2

(12) United States Patent
Ahmed

(10) Patent No.: US 12,587,295 B2
(45) Date of Patent: Mar. 24, 2026

(54) METHOD AND APPARATUS FOR INTER-PATH DELAY ESTIMATION

(71) Applicant: Jabil Inc., St. Petersburg, FL (US)

(72) Inventor: Walid Khairy Mohamed Ahmed, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 475 days.

(21) Appl. No.: 18/015,126

(22) PCT Filed: Jul. 9, 2021

(86) PCT No.: PCT/US2021/041085

§ 371 (c)(1),
(2) Date: Jan. 9, 2023

(87) PCT Pub. No.: WO2022/011259

PCT Pub. Date: Jan. 13, 2022

(65) Prior Publication Data

US 2023/0261773 A1 Aug. 17, 2023

Related U.S. Application Data

(60) Provisional application No. 63/050,436, filed on Jul. 10, 2020.

(51) Int. Cl.
  *H04B 17/364* (2015.01)
  *H04B 17/318* (2015.01)
  *H04W 24/08* (2009.01)
(52) U.S. Cl.
  CPC ......... *H04B 17/364* (2015.01); *H04B 17/318* (2015.01); *H04W 24/08* (2013.01)

(58) Field of Classification Search
  CPC .... H04B 17/364; H04B 17/318; H04W 24/08
  USPC .......................................................... 370/252
  See application file for complete search history.

(56) References Cited

U.S. PATENT DOCUMENTS

| | | | | |
|---|---|---|---|---|
| 7,236,515 | B1 * | 6/2007 | Pope .................... | H04B 1/7115 |
| | | | | 375/147 |
| 9,692,366 | B2 * | 6/2017 | Pilgram .................. | H03F 3/24 |
| 2015/0103955 | A1 | 4/2015 | Bartram | |
| 2016/0164760 | A1 * | 6/2016 | Wakabayashi ...... | H04L 43/0858 |
| | | | | 370/252 |
| 2018/0227152 | A1 | 8/2018 | Kim et al. | |

(Continued)

FOREIGN PATENT DOCUMENTS

| | | | |
|---|---|---|---|
| WO | 2019145565 A1 | 8/2019 | |
| WO | 2019174757 A1 | 9/2019 | |
| WO | 2020021628 A1 | 1/2020 | |

*Primary Examiner* — Christopher M Crutchfield
*Assistant Examiner* — Jean F Voltaire
(74) *Attorney, Agent, or Firm* — Young Basile Hanlon & MacFarlane, P.C.

(57) ABSTRACT

Methods and systems for inter-path delay estimation. A method for inter-path delay estimation includes injecting, nearly simultaneously, a continuous wave tone at an input test point in a first communication path and at an input test point in a second communication path, combining output signals from the first communication path and the second communication path, measuring a magnitude of a combined output signal using an envelope detector, and adjusting a delay element in one of the first communication path and the second communication path until the magnitude of the combined output signal is maximized.

20 Claims, 5 Drawing Sheets

(56)                 References Cited

U.S. PATENT DOCUMENTS

| | | |
|---|---|---|
| 2018/0351770 A1 | 12/2018 | Chiu et al. |
| 2021/0044310 A1 | 2/2021 | Ramabadran et al. |
| 2021/0344111 A1* | 11/2021 | Kihira .................... H04B 17/12 |

* cited by examiner

METHOD AND APPARATUS FOR INTER-PATH DELAY ESTIMATION

CROSS-REFERENCE TO RELATED APPLICATION(S)

This application is a national stage entry of International Patent Application Serial No. PCT/US2021/041085, filed Jul. 9, 2021, which claims priority to U.S. Provisional Application Ser. No. 63/050,436, filed Jul. 10, 2020, the entire disclosures of which are incorporated herein.

TECHNICAL FIELD

This disclosure relates to communication devices and systems.

BACKGROUND

Communication devices can include wireless devices, radio frequency (RF) devices, and like devices which transmit and receive RF or radio signals to communicate with other communication devices. Communication devices and systems can include transmitters, receivers, transceivers, antennae, and other components. Each of the transmitters, receivers, and transceivers can include a number of analog and digital components or modules which define a communication path including, for example, a carrier path, an antenna path, or the like. Each communication path can be a transmitter path or a receiver path, as appropriate. The communication devices and systems can include multiple RF channels, resulting in multiple communication paths. Each of the communication paths have a communication path delay. Improved methods for measuring an inter-path delay as between any two communication paths is needed.

SUMMARY

Disclosed herein are methods and systems for inter-path delay estimation.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
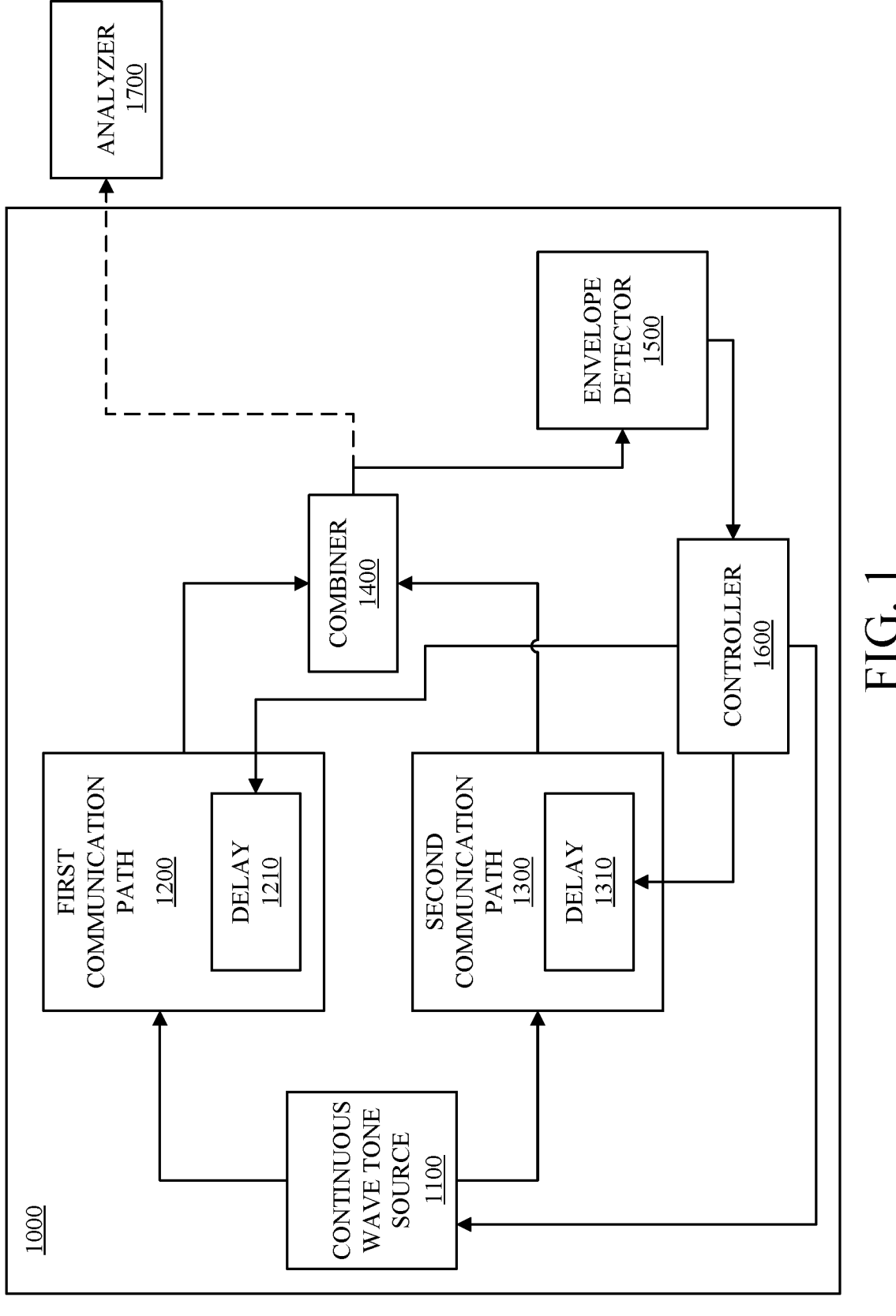
FIG. 1 is a block diagram of an example of communication paths in a communication device in accordance with embodiments.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices, and systems for inter-path delay estimation. Communication devices include wireless devices, radio frequency (RF) devices, and the like such as base stations, mobile devices, and the like. The communication devices include a number of analog and digital components or modules, including a configurable or adjustable delay, which form communication paths including, for example, carrier paths, antenna paths, or the like in the transmitters, receivers, or transceivers of the communication devices. Each of the communication paths have a communication path delay. The inter-path delay estimation method described herein injects a continuous wave tone at designated points in to two selected communication paths. Outputs at selected points from the two communication paths are combined. In implementations, a magnitude of the combined output signal is measured using an envelope detector. In implementations, the configurable or adjustable delay is adjusted and a delay match is achieved between the two communication paths when a maximum magnitude is detected.

The inter-path delay estimation method provides a means for verifying that the delay mismatch between two communication paths (e.g., antenna or carrier paths) is eliminated. The inter-path delay estimation method can measure and quantify the residual delay mismatch between communication paths. In implementations, the inter-path delay estimation method provides a method to self-calibrate carrier and antenna paths for delay mismatches to ensure optimal antenna-array operation (e.g., in 5G massive MIMO and beam-forming systems). In contrast, other methods use a two-channel high-speed scope to capture data. The captured data, such as in-phase and quadrature phase (IQ) data from each communication path, is then analyzed offline to estimate delay mismatch. These methods require more elaborate and costly laboratory setups and are inefficient.

FIG. 1 is a block diagram of an example of communication paths in a communication device 1000 in accordance with embodiments. The communication device 1000 can include a continuous wave tone source 1100 connected to or be in communication with (collectively "connected to") a first communication path 1200 and a second communication path 1300. The first communication path 1200 and the second communication path 1300 can be connected to a combiner 1400, which in turn can be connected to an envelope detector 1500. The envelope detector 1500 can be connected to a controller 1600, which in turn can be connected to the continuous wave tone source 1100, the first communication path 1200, and the second communication path 1300. In implementations, the combiner 1400 can be connected to an analyzer 1700. The communication device 1000 and the components therein may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

In implementations, the communication device 1000 can include multiple communication paths. In this instance, the first communication path 1200 and the second communication path 1300 are selected from the multiple communication paths for illustrative purposes.

The first communication path 1200 and the second communication path 1300 (as well as any of the multiple communication paths) (collectively "communication paths") can each include analog and/or digital components for implementing a transmitter, a receiver, a transceiver, and the like to provide wireless communications, RF communications, and the like. In implementations, the communication paths can be antenna communication paths, carrier communication paths, and the like. The selected communication paths, the first communication path 1200 and the second communication path 130 are selected for employing the inter-path delay estimation method as described herein. Each of the first communication path 1200 and the second communication path 1300 can include a variable or configurable delay element 1210 and 1310, respectively. In implementations, each of the communication paths can include a variable or configurable delay element.

In implementations, the variable or configurable delay element can be a cascade of an integer delay (buffer) element (e.g., having a range ±48 samples), and a polynomial based (Lagrange) fractional (fraction of a sample period) delay element (e.g., having a range ±0.9 with an accuracy or resolution down to 0.03). The variable or configurable delay element can be implemented at the input of (before) a carrier up-conversion stage on a downlink communication path or at an output (after) a carrier down-conversion stage on an uplink communication path. There is a dedicated delay element per each carrier path on the downlink communication path and on the uplink communication path.

As noted, the continuous wave tone source 1100 and the combiner 1400 are connected to the first communication path 1200 and the second communication path 1300. In implementations, the connections to the continuous wave tone source and the combiner are selectable to input test points and output test points in the first communication path 1200 and the second communication path 1300.

The envelope detector 1500 can be an envelope detector, a relative signal strength indication (RSSI) meter, an analyzer, and the like (collectively "envelope detector") which can determine a magnitude of an output signal from the combiner 1400.

The controller 1600 can be connected to the continuous wave tone source 1100 and the combiner 1400 to selectively connect to the communication paths such as the first communication path 1200 and the second communication path 1300. For example, the connections can be at digital-to-analog converter (DAC) inputs for two target antenna paths to obtain inter-antenna delay mismatches.

In implementations, the controller 1600 can control or change the amount of delay, as in the first communication path 1200 and the second communication path 1300, based on the output from the envelope detector 1500 as described herein.

In implementations, the communication paths such as the first communication path 1200 and the second communication path 1300, the continuous wave tone source 1100, the combiner 1400, the envelope detector 1500, and the controller 1600 can be an integrated device to enable self-configuration as described herein. In implementations, the components and elements described herein can be analog, digital, or combinations thereof.

Figure 2:
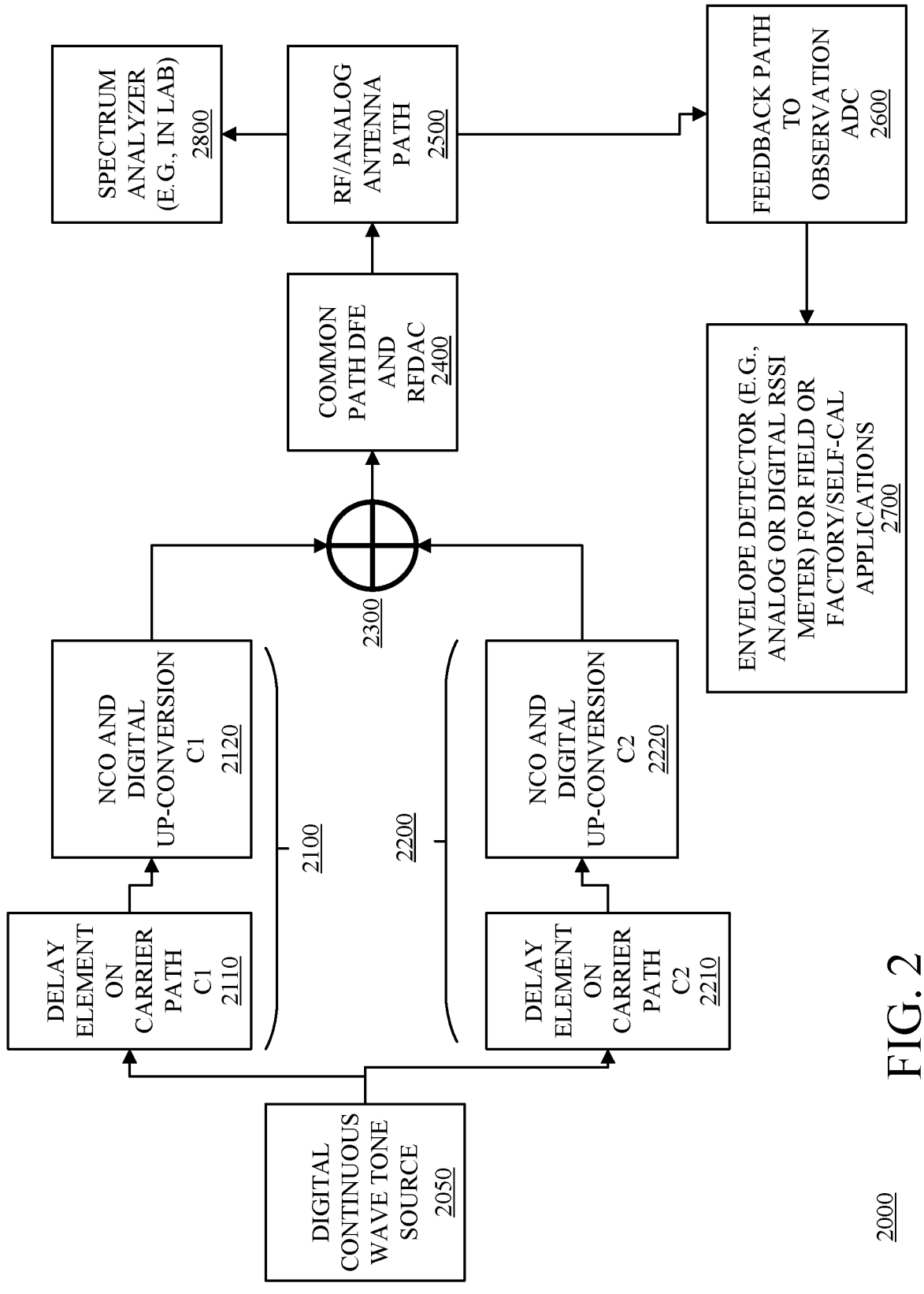
FIG. 2 is a block diagram of an example of communication paths in a communication device in accordance with embodiments.

FIG. 2 is a block diagram of an example of communication paths in a communication device 2000 in accordance with embodiments. The communication device 2000 can include a digital continuous wave tone source 2050 connected a carrier path C1 2100 and a carrier path C2 2200, where the carrier path C1 2100 includes a delay element 2110 connected to a numerically-controlled oscillator (NCO) and digital up-conversion circuit 2120 and the carrier path C2 2200 includes a delay element 2210 connected to a NCO and digital up-conversion circuit 2220. The output of the NCO and digital up-conversion circuit 2120 and the NCO and digital up-conversion circuit 2220 can be connected to a combiner 2300. The output of the combiner 2300 can be processed through a common path digital front end (DFE) and a RF DAC 2400 and a RF and/or analog antenna path 2500. The output of the RF and/or analog antenna path 2500 can be connected to an envelope detector 2700 via an analog-to-digital converter (ADC) 2600 for on-chip self-calibration or off-chip calibration. In implementations, the output of the RF and/or analog antenna path 2500 can be connected to a spectrum analyzer 2800 for off-chip analysis.

Figure 3:
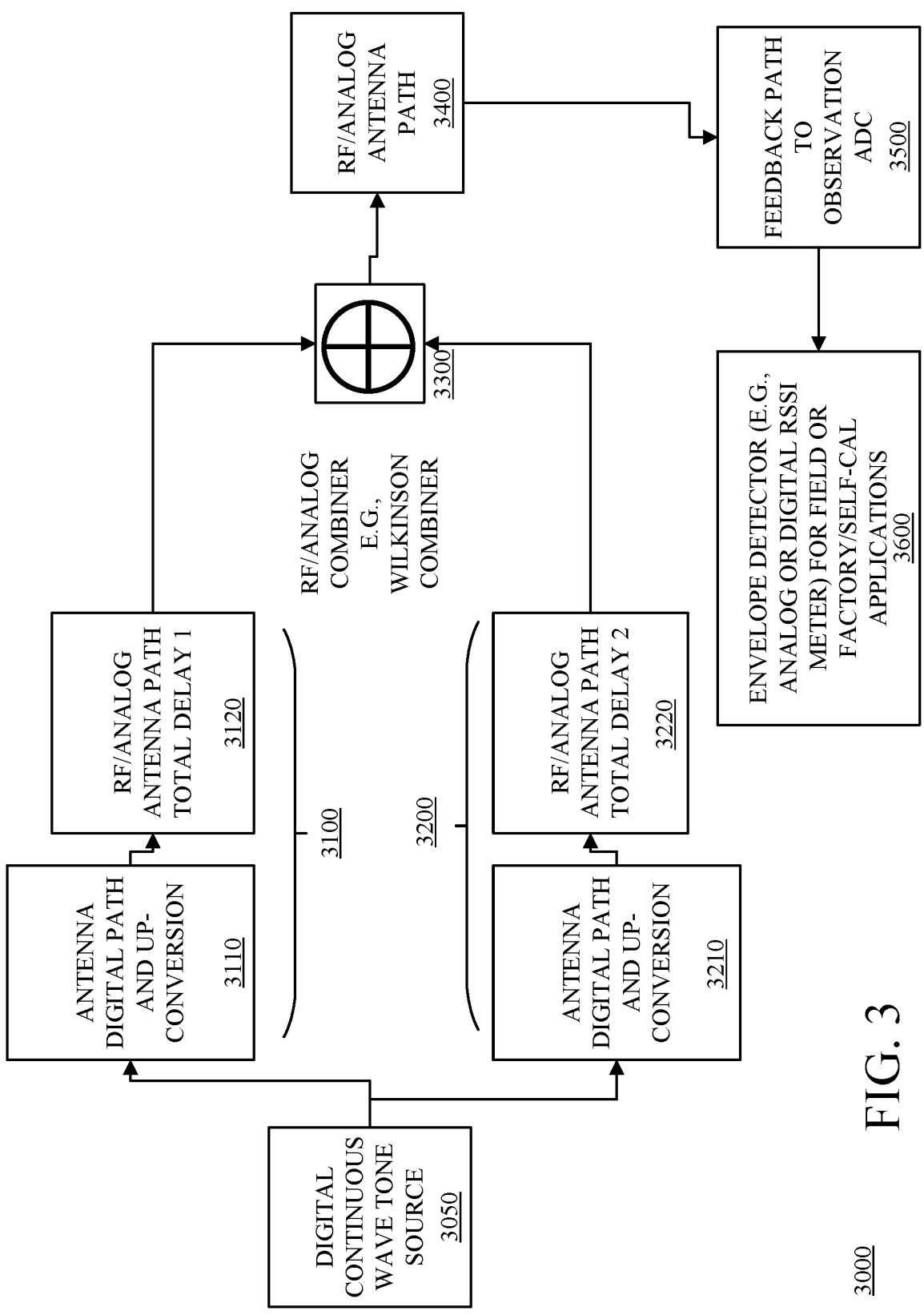
FIG. 3 is a block diagram of an example of communication paths in a communication device in accordance with embodiments.

FIG. 3 is a block diagram of an example of communication paths in a communication device 3000 in accordance with embodiments. The communication device 3000 can include a digital continuous wave tone source 3050 connected to a first path 3100 and a second path 3200, where the first path 3100 can include an antenna digital path and up-conversion circuit 3110 connected to an RF and/or analog antenna path with total delay 1 3120 and the second path 3200 can include an antenna digital path and up-conversion circuit 3210 connected to an RF and/or analog antenna path with total delay 1 3220. The outputs of the RF and/or analog antenna path with total delay 1 3120 and the RF and/or analog antenna path with total delay 2 3220 can be connected to a combiner 3300. In implementations, the combiner 3300 can be an RF combiner. In implementations, the combiner 3300 can be an analog combiner. In implementations, the combiner 3300 can be a Wilkinson combiner. In implementations, the output of combiner 3300 can be connected to a spectrum analyzer for off-chip analysis. In implementations, the output of the combiner 3300 can be connected to an envelope detector 3600 via an ADC 3500 for on-chip self-calibration or off-chip calibration.

Figure 4:
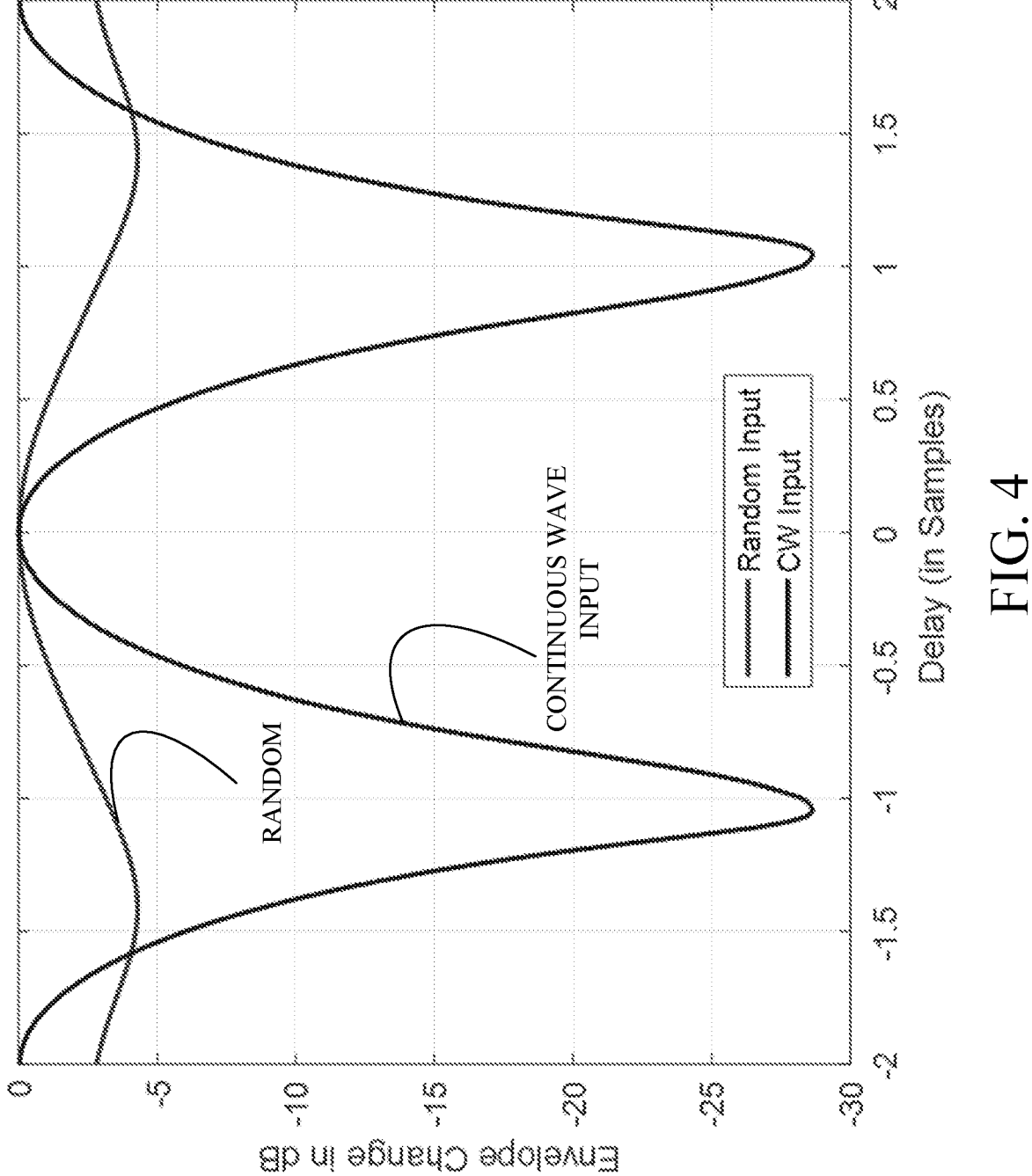
FIG. 4 is a graph illustrating envelope detection analysis in accordance with embodiments.

FIG. 4 is a graph illustrating envelope detection analysis in accordance with embodiments. The graph compares the change in the envelope power (discrimination performance) for a pseudo-random input (e.g., similar to a full allocation of all sub-carriers) versus a continuous wave (CW) at the Nyquist fastest possible tone frequency (e.g., using the highest frequency sub-carrier). As shown, the CW based input has better discrimination in terms of the envelope power change versus the delay as a fraction of a sample period. That is, the fastest tone (e.g., fastest sub-carrier) is the most sensitive signal to delay offsets (which translate into phase shifts proportional to the tone frequency).

Figure 5:
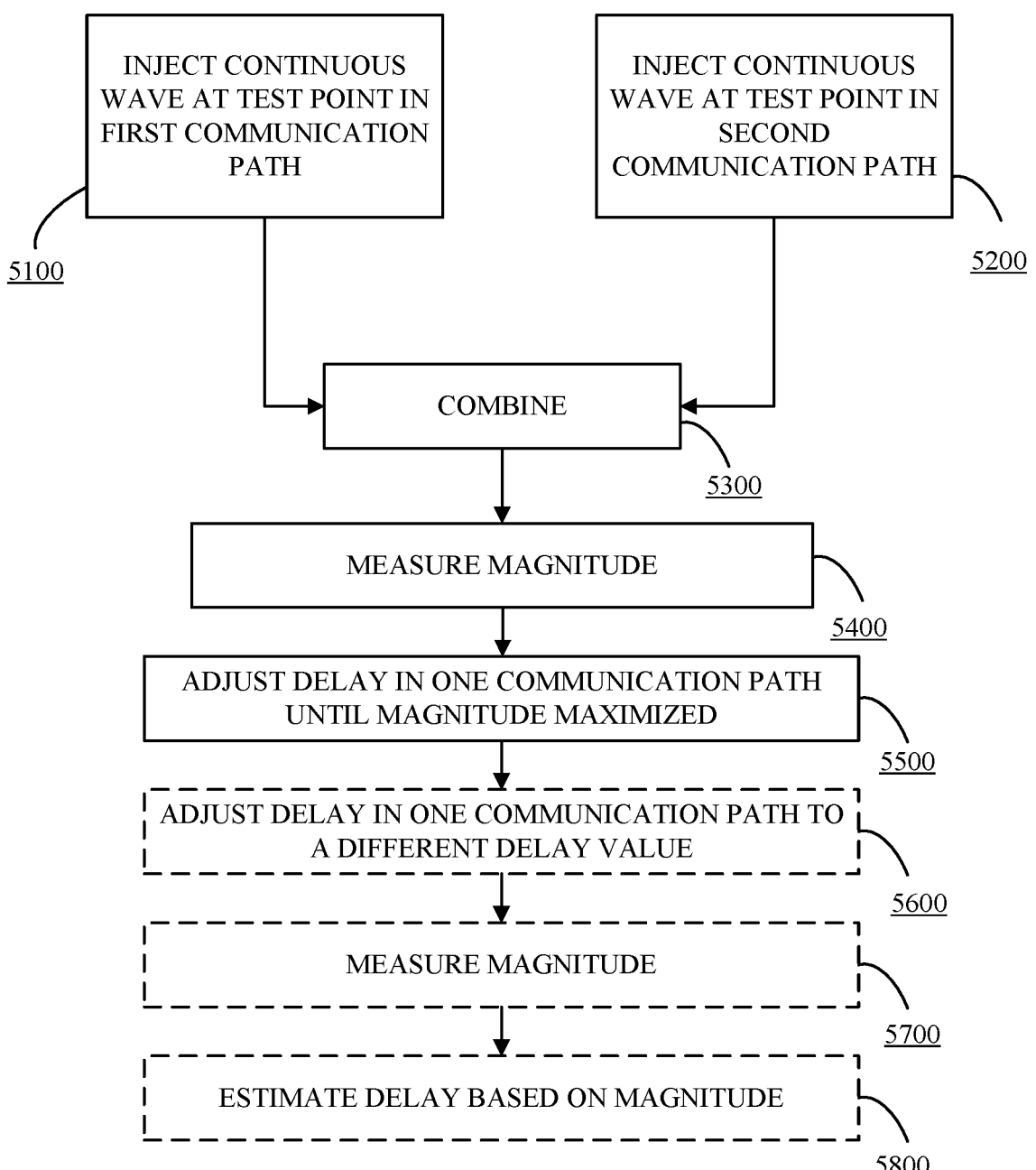
FIG. 5 is a flowchart of an example method for inter-path estimation in accordance with embodiments.

FIG. 5 is a flowchart of an example method 5000 for inter-path estimation in accordance with embodiments. In implementations, the method can be used with the communication devices 1000, 2000, and 3000 shown in FIG. 1, FIG. 2, and FIG. 3, respectively. The method 5000 includes injecting 5100 a continuous wave tone at a test in a first communication path; injecting 5200 a continuous wave tone at a test in a second communication path; combining 5300 outputs from each communication path; measuring 5400 a magnitude of an output signal; and adjusting 5500 a delay in one of the communication paths until magnitude maximized. In implementations, the method 5000 includes: adjusting 5600 a delay in one of the communication paths to a different delay value; measuring 5700 a magnitude of an output signal; and estimating 5800 a delay based on a measured magnitude.

The method 5000 includes injecting 5100 a continuous wave tone at a test in a first communication path and injecting 5200 a continuous wave tone at a test in a second communication path. A continuous wave tone can be injected, nearly simultaneously, at an input test point in a first communication path and at an input test point in a second communication path. In implementations, the test point can be at a delay element input. In implementations, the input test point in the first communication path and the input test point in the second communication path can be different test points. In implementations, a controller can select which communications are to be measured.

The method 5000 includes combining 5300 outputs from each communication path and measuring 5400 a magnitude of an output signal. An output can be taken from an output test point which is after combination of the signals from the first communication path and the second communication path. The magnitude of the output signal is measured (e.g. in dBm). The magnitude correlates or corresponds to a relative delay difference between the first communication path and the second communication path.

The method 5000 includes adjusting 5500 a delay in one of the communication paths until magnitude maximized. A delay element can be adjusted in one of the first communication path or the second communication path until the magnitude of the output signal is maximized. This is the point of perfect delay match between the two communication paths. The result of the measurements and adjustments can be used to calibrate a communication device including the communication paths. In implementations, the calibration can be done on-chip as self-calibration. In implementations, the calibration can be done off-chip as factory calibration.

In implementations, the method 5000 includes adjusting 5600 a delay in one of the communication paths to a different delay value, measuring 5700 a magnitude of an output signal, and estimating 5800 a delay based on a measured magnitude. In implementations, the delay can be set to a different value and the magnitude can be measured. The measured magnitude can then be used to determine if an estimated delay matches the applied delay. The estimated delay can be determined by mapping or comparing the measured magnitude against the data representative of the graph of FIG. 4, for example. The change in magnitude relative to the matched delay can provide the estimated delay. In implementations, a look up table can be used.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for inter-path delay estimation, the method comprising:

injecting, nearly simultaneously, a continuous wave tone at an input test point in a first communication path and at an input test point in a second communication path, wherein the input test point for the first communication path and the input test point for the second communication path are at inputs to respective delay elements in each of the first communication path and the second communication path;

combining output signals from the first communication path and the second communication path;

measuring a magnitude of a combined output signal using an envelope detector; and adjusting a delay element in one of the first communication path and the second communication path until the magnitude of the combined output signal is maximized.

2. The method of claim 1, the method further comprising:

selecting, by a controller, the first communication path and the second communication path from multiple communication paths.

3. The method of claim 1, wherein the delay element is a cascade of an integer delay element and a polynomial based Lagrange fractional delay element.

4. The method of claim 1, the method further comprising:

selecting, by a controller, the input test point for the first communication path and the input test point for the second communication path.

5. The method of claim 1, the method further comprising:

selecting, by a controller, an output test point at a point after combining the output signals.

6. The method of claim 1, wherein the envelope detector is a relative signal strength indication meter.

7. The method of claim 1, the method further comprising:

adjusting a delay in one of the first communication path and the second communication path to a different delay value;

measuring a magnitude of a combined output signal; and estimating a delay based on a measured magnitude compared with an applied delay.

8. A communication device, comprising:

two communication paths, each of the two communication paths configured to receive a continuous wave tone at an input test point, wherein an input test point for one communication path of the two communication paths and an input test point for an other communication path of the two communication paths are at inputs to respective delay elements in the one communication path and the other communication path;

a combiner configured to combine outputs from the two communication paths;

an envelope detector configured to detect a magnitude of a combined output signal; and a controller configured to adjust a delay value of a variable delay in one of the two communication paths until the magnitude of the combined output signal is maximized.

9. The communication device of claim 8, the controller further configured to:

select the one communication path and the other communication path from multiple communication paths; and select the input test point for the one communication path and the input test point for the other communication path.

10. The communication device of claim 8, wherein each variable delay is a cascade of an integer delay element and a polynomial based Lagrange fractional delay element.

11. The communication device of claim 8, wherein the envelope detector is a relative signal strength indication meter.

12. The communication device of claim 8, further comprising:

the controller further configured to adjust the variable delay to a different delay value;

the envelope detector configured to detect a magnitude of a combined output signal; and the controller further configured to estimate a delay value based on a measured magnitude compared with an applied delay.

13. A method for inter-path delay estimation, the method comprising:

outputting a first signal from a first communication path based on injecting a continuous wave tone at a first test point, wherein the first test point is at an input to a delay element in the first communication path;

outputting a second signal from a second communication path based on injecting the continuous wave tone at a second test point, wherein the second test point is at an input to a delay element in the second communication path;

combining the first signal and the second signal into an output signal;

measuring a magnitude of the output signal using an envelope detector; and adjusting a delay element in one of the first communication path and the second communication path until a maximum output signal is achieved.

14. The method of claim 13, the method further comprising:

adjusting the delay element to a different delay value;

measuring a magnitude of an output signal; and comparing an applied delay with an estimated delay based on a measured magnitude.

15. The communication device of claim 8, the controller further configured to:

select an output test point at a point after the combiner.

16. The method of claim 13, the method further comprising:

selecting, by a controller, the first communication path and the second communication path from multiple communication paths.

17. The method of claim 13, wherein the delay element is a cascade of an integer delay element and a polynomial based Lagrange fractional delay element.

18. The method of claim 13, the method further comprising:

selecting, by a controller, the first test point and the second test point.

19. The method of claim 13, the method further comprising:

selecting, by a controller, an output test point at a point after combining the first signal and the second signal.

20. The method of claim 13, wherein the envelope detector is a relative signal strength indication meter.

\* \* \* \* \*